(12) United States Patent
Zarnescu et al.

(10) Patent No.: US 8,104,412 B2
(45) Date of Patent: Jan. 31, 2012

(54) DEFLECTOR DEVICE FOR COAL PIPING SYSTEMS

(75) Inventors: Vlad Zarnescu, Worcester, MA (US); Craig A. Penterson, Sutton, MA (US)

(73) Assignee: Riley Power Inc., Worcester, MA (US)

( * ) Notice: Subject to any disclaimer, the term of this patent is extended or adjusted under 35 U.S.C. 154(b) by 259 days.

(21) Appl. No.: 12/196,031

(22) Filed: Aug. 21, 2008

(65) Prior Publication Data
US 2010/0044282 A1 Feb. 25, 2010

(51) Int. Cl.
*F23D 1/00* (2006.01)
*F23K 1/00* (2006.01)

(52) U.S. Cl. .......................... 110/263; 110/232; 110/347

(58) Field of Classification Search .................. 110/106, 110/104 B, 261, 263, 264, 265, 347, 232; 431/8; 138/40, 44, 45, 46, 39; 239/498, 239/499, 502, 503, 500, 461
See application file for complete search history.

(56) References Cited

U.S. PATENT DOCUMENTS

| | | | |
|---|---|---|---|
| 1,315,719 A | 9/1919 | Grindle | |
| 3,511,445 A | 5/1970 | Ashdown | |
| 4,186,599 A | 2/1980 | Frick | |
| 4,223,615 A | 9/1980 | Breen et al. | |
| 4,380,202 A * | 4/1983 | LaRue et al. | 110/263 |
| 5,421,274 A * | 6/1995 | Gordon et al. | 110/232 |
| 5,568,777 A | 10/1996 | Breen et al. | |
| 5,593,131 A | 1/1997 | Briggs, Jr. et al. | |
| 5,685,240 A | 11/1997 | Briggs, Jr. et al. | |
| 5,937,770 A * | 8/1999 | Kobayashi et al. | 110/263 |
| 6,234,090 B1 | 5/2001 | Wark et al. | |
| 6,237,510 B1 * | 5/2001 | Tsumura et al. | 110/262 |
| 6,257,415 B1 | 7/2001 | Wark | |
| 6,474,250 B1 | 11/2002 | Penterson et al. | |
| 6,588,598 B2 | 7/2003 | Wark | |
| 6,607,079 B2 | 8/2003 | Laux | |
| 6,840,183 B2 | 1/2005 | Wark | |
| 6,899,041 B2 | 5/2005 | Wark | |
| 7,665,408 B2 * | 2/2010 | Okazaki et al. | 110/263 |
| 2005/0042043 A1 | 2/2005 | Levy et al. | |
| 2007/0214896 A1 | 9/2007 | Orleskie et al. | |
| 2007/0281265 A1 * | 12/2007 | Sarv et al. | 110/261 |

(Continued)

FOREIGN PATENT DOCUMENTS

EP 0076660 A2 4/1983

OTHER PUBLICATIONS

International Search Report for PCT/US2009/053592, dated Mar. 17, 2010.

(Continued)

*Primary Examiner* — Kenneth Rinehart
*Assistant Examiner* — David J Laux
(74) *Attorney, Agent, or Firm* — Joshua L. Jones; Edwards Wildman Palmer LLP

(57) ABSTRACT

A deflector device for improving particle distribution within a coal piping system includes a base defining an outer circumference. The base is configured to be mounted inside a pipe such that the base extends partially around the inner circumference of the pipe with the circumferences of the pipe and base being substantially aligned concentrically. A deflector extends radially inward from the base. The deflector is configured to direct a concentrated flow of coal particles toward the center of the pipe.

16 Claims, 3 Drawing Sheets

U.S. PATENT DOCUMENTS

2008/0210325 A1* 9/2008 Aroussi .................... 138/39

OTHER PUBLICATIONS

Written Opinion of the International Searching Authority for PCT/US2009/053592, dated Mar. 17, 2010.

International Search Report for PCT/US09/37274, dated May 14, 2009.

Written Opinion of the International Searching Authority for PCT/US09/37274, dated May 14, 2009.

* cited by examiner

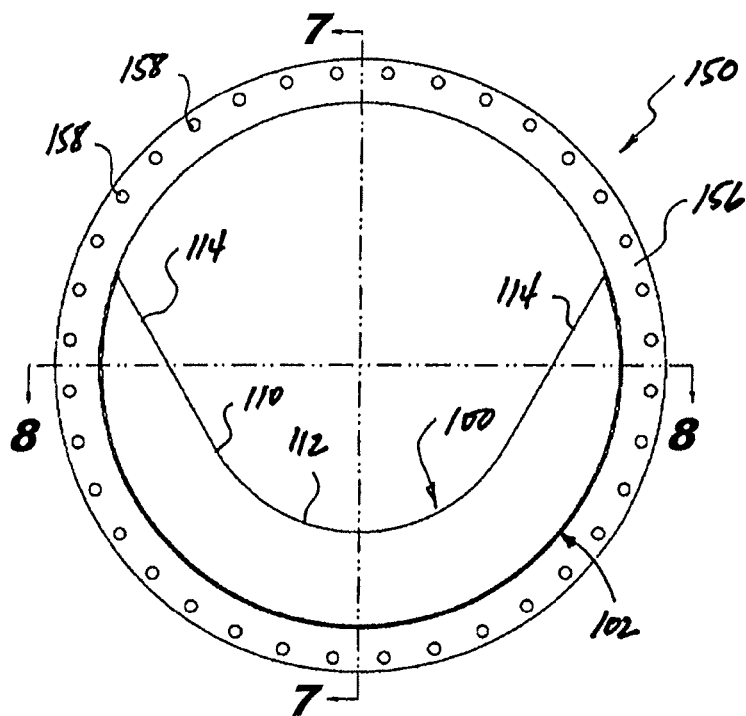
Fig. 6
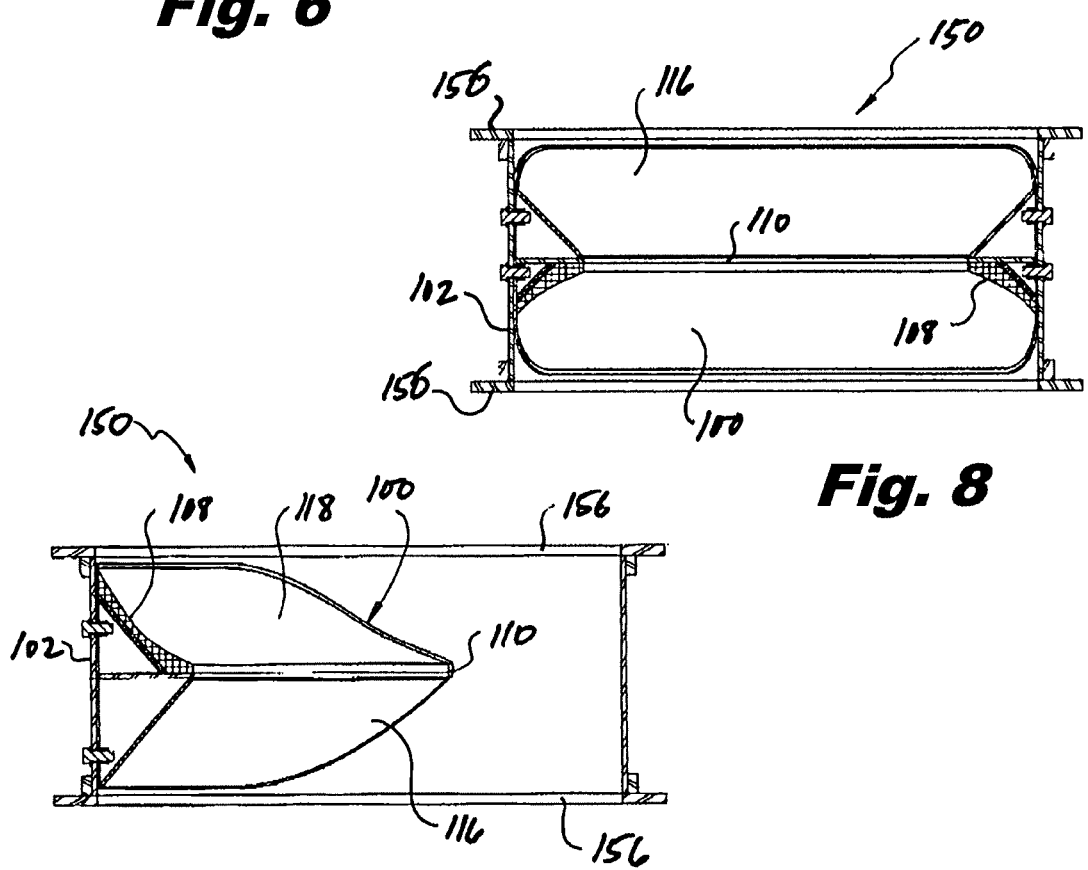
Fig. 8
Fig. 7

DEFLECTOR DEVICE FOR COAL PIPING SYSTEMS

BACKGROUND OF THE INVENTION

1. Field of the Invention

The present invention relates to piping systems for conducting mixed flows of gas and particles, and more particularly to coal piping systems.

2. Description of Related Art

A variety of devices and methods are known in the art for delivering pulverized coal to coal fired burners. Of such devices, many are directed to improving particle distribution within coal piping systems for delivering coal to be combusted.

Coal powered plants require an efficient means of supplying coal as fuel to produce heat power. Raw coal is typically pulverized in a coal pulverizer or mill to produce small coal particles or coal dust. The pulverized coal must then be delivered to a furnace or burner where it can be used for combustion. This is typically done with a coal piping system that utilizes air flows to transport pulverized coal particles from the mill or pulverizer to a nozzle where coal particles are injected into the coal burner or furnace. As the coal particles travel in the air flow through the piping system, bends in the piping and the pipe geometry in general tend to cause non-uniform coal particle distribution. This non-uniform distribution frequently occurs just downstream of elbows in a piping system.

Non-uniform particle distribution causes various technical problems for operation and maintenance of coal systems. If poor particle distribution extends into the combustion zone, localized imbalances in the fuel/air mixture can cause inefficient combustion and elevated emissions of $NO_x$, CO, and other pollutants. It can also cause elevated levels of unburned carbon in the fly ash, which will lower combustion efficiency. The highly abrasive nature of the coal rope impacting and scrubbing components of the coal piping and burning system causes extensive erosion of pipes and other components in the system, leading to frequent need for inspection, repairs, and replacement of parts. If inspections, repairs and replacements are not performed in a timely manner, there is an elevated chance that abrasion from coal roping will cause expensive or dangerous failures of key components. Poorly distributed particles can also hamper the performance of components like the classifier. For example, an uneven particle distribution flowing into a coal classifier can cause one portion of the classifier to wear out earlier than the rest and can lead to full utilization of only a portion of the classifier.

Various solutions to the problem of particle distribution in coal piping systems are known in the art. Known systems are designed to break up coal ropes, which are concentrated regions of coal particles running through a piping system. The known systems are generally used to break up coal ropes just upstream of coal nozzles/burners to provide an even distribution of particles into the combustion zone.

Such conventional methods and systems generally have been considered satisfactory for their intended purpose. However, there still remains a continued need in the art for methods and devices that can improve particle distribution upstream of components other than the burners. There also remains a need in the art for such methods and devices that are easy to install and/or replace and that impart low pressure drop. The present invention provides a solution for these problems.

SUMMARY OF THE INVENTION

The subject invention is directed to a new and useful deflector device for improving particle distribution within a coal piping system. The device includes a base defining an outer circumference. The base is configured to be mounted inside a pipe such that the base extends partially around the inner circumference of the pipe with the circumferences of the pipe and base being substantially aligned concentrically. A deflector extends radially inward from the base. The deflector is configured to direct a concentrated flow of coal particles toward the center of the pipe.

In one aspect, it is envisioned that the upstream surface of the deflector can slope concavely between the base and a radially inner periphery of the deflector. The inner periphery of the deflector can define a substantially circular section disposed circumferentially between substantially straight sections. There can be a single substantially straight section on each side of the circular section of the inner periphery of the deflector. The circular section of the inner periphery of the deflector can be circumferentially centered between the substantially straight sections. The substantially straight sections can each be tangent with the circular section wherein each substantially straight section extends from the circular section outward to the outer circumference defined by the base. It is also contemplated that substantially all of the deflector can have a radial cross-section that is generally triangular.

The invention also provides a deflector assembly for improving particle distribution within a coal piping system. The assembly includes a spool piece having a generally cylindrical interior. The spool piece is configured to be joined between end flanges of adjacent pipes in a coal piping system such that the cylindrical interior of the spool piece is generally aligned with the interiors of the adjacent pipes. The assembly also includes a deflector device. The deflector device has a base defining an outer circumference. The base is mounted inside the spool piece such that the base extends partially around the inner circumference of the spool piece with the circumferences of the spool piece and base being substantially aligned concentrically. A deflector extends radially inward from the base. The deflector is configured to direct a concentrated flow of coal particles centrally within a downstream adjacent pipe.

It is contemplated that the base of the deflector device can be bolted to the spool piece. The spool piece can include opposed end flanges configured and adapted to join the spool piece between end flanges of two adjacent pipes in a coal piping system. The end flanges of the spool piece can each define a plurality of bores for bolting the spool piece into place between two adjacent pipes. It is envisioned that the spool piece can be configured to be adjustable circumferentially in increments of between about 10 and about 15 degrees.

These and other features of the systems, devices, and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 6 is a plan view of the deflector assembly of FIG. 5, showing the sloping downstream surface of the deflector;

FIG. 7 is a cross-sectional side elevation view of the deflector assembly of FIG. 6, taken along section line 7-7 to show the radial cross-sectional profile of the deflector assembly of FIG. 6 adjacent to the circular portion of the inner periphery thereof, and FIG. 8 is a cross-sectional side elevation view of the deflector assembly of FIG. 6, taken along section line 8-8 to show the radial cross-sectional profile of the portions of the deflector adjacent to the straight portions of the inner periphery thereof.

DETAILED DESCRIPTION OF THE INVENTION

Figures 1, 2:
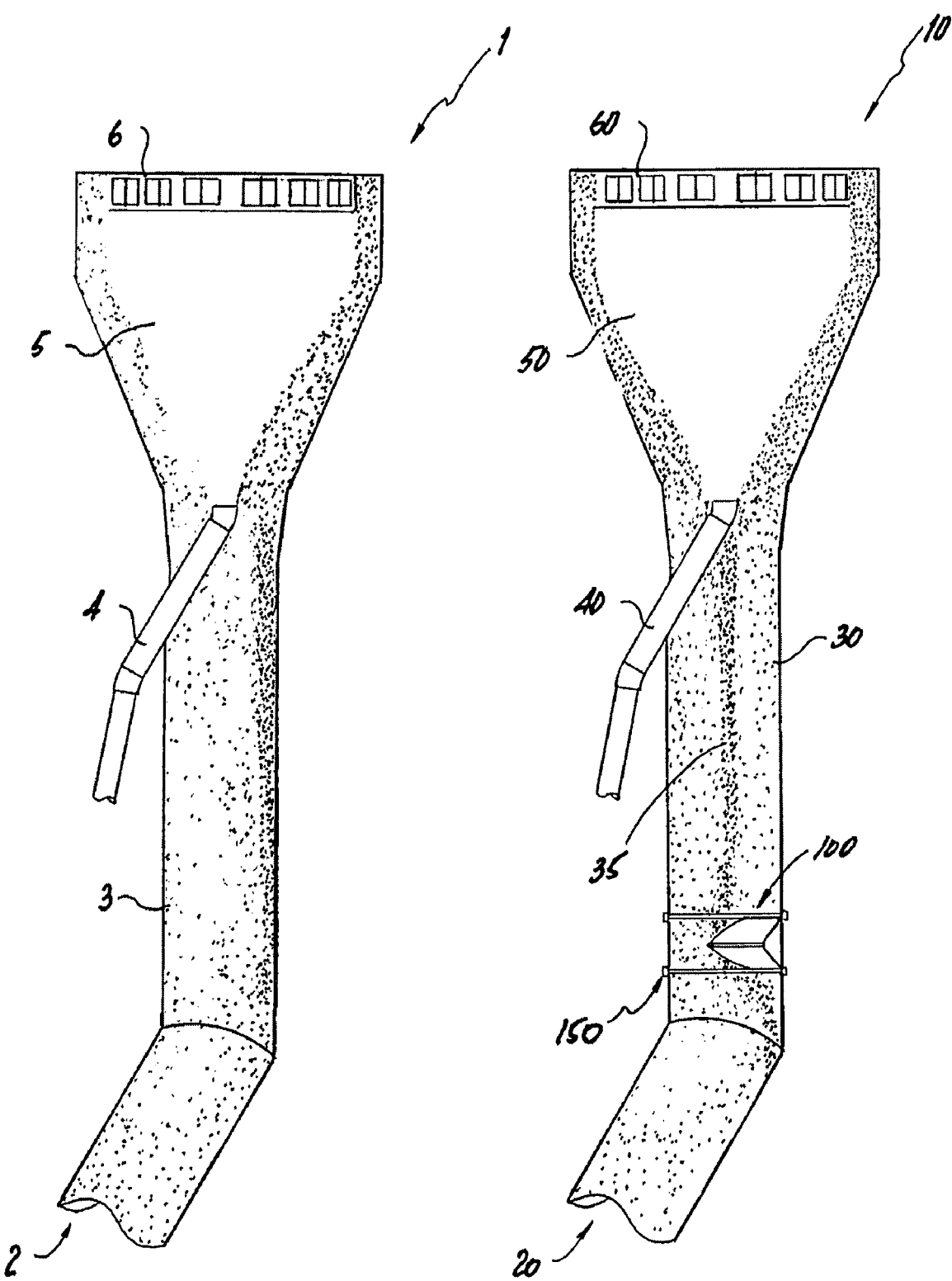
FIG. 1 is a schematic view of a portion of a prior art coal piping system, showing the uneven distribution of particles flowing into the classifier as a result of the piping elbow between the mill and the classifier.
FIG. 2 is a schematic view of an exemplary embodiment of a portion of a coal piping system including a deflector device constructed in accordance with the present invention, showing the deflector device centering a concentrated stream of coal particles and thus improving particle distribution for the classifier.

Reference will now be made to the drawings wherein like reference numerals identify similar structural features or aspects of the subject invention. For purposes of explanation and illustration, and not limitation, a partial view of an exemplary embodiment of a deflector device in accordance with the invention is shown in FIG. 2 and is designated generally by reference character 100. Other embodiments of deflector devices in accordance with the invention, or aspects thereof, are provided in FIGS. 3-8, as will be described. The systems and methods of the invention can be used in coal piping systems, or in any other suitable application, for enhanced particle distribution in a mixed flow of gas and solid particles.

As shown in FIG. 1, a typical coal power system 1 includes a mill or other pulverizing means for supplying fine coal particles for combustion. Coal fines are conveyed through system 1 in gas/particle mixtures. Particles entering elbow 2 downstream of the mill tend to concentrate on the outside of the corner of the elbow, and remain along the same edge through subsequent pipes 3. This concentrated flow of particles clings to one side of pipes 3, past rejects pipe 4, through inner cone 5 and into classifier vanes 6. However, since the concentration of particles is greater on one side of pipes 3 entering inner cone 5 of the classifier, some of classifier vanes 6 receive much higher concentrations of coal particles than others, as indicated by stippling in FIG. 1. This leads to uneven wear and under utilization of portions of the classifier.

FIG. 2 shows a system 10 in accordance with the present invention, having inlet elbow 20, coal pipes 30, rejects pipe 40, inner classifier cone 50, and classifier vanes 60, much as described above with respect to FIG. 1. However, the coal particle distribution around inner cone 50 and classifier vanes 60 is significantly more even in system 10 than in system 1 due to deflector device 100 downstream of inlet elbow 20 deflecting and redistributing the stream of coal particles 35 away from the pipe walls and into the center of pipes 30, as indicated in FIG. 2.

Figure 3:
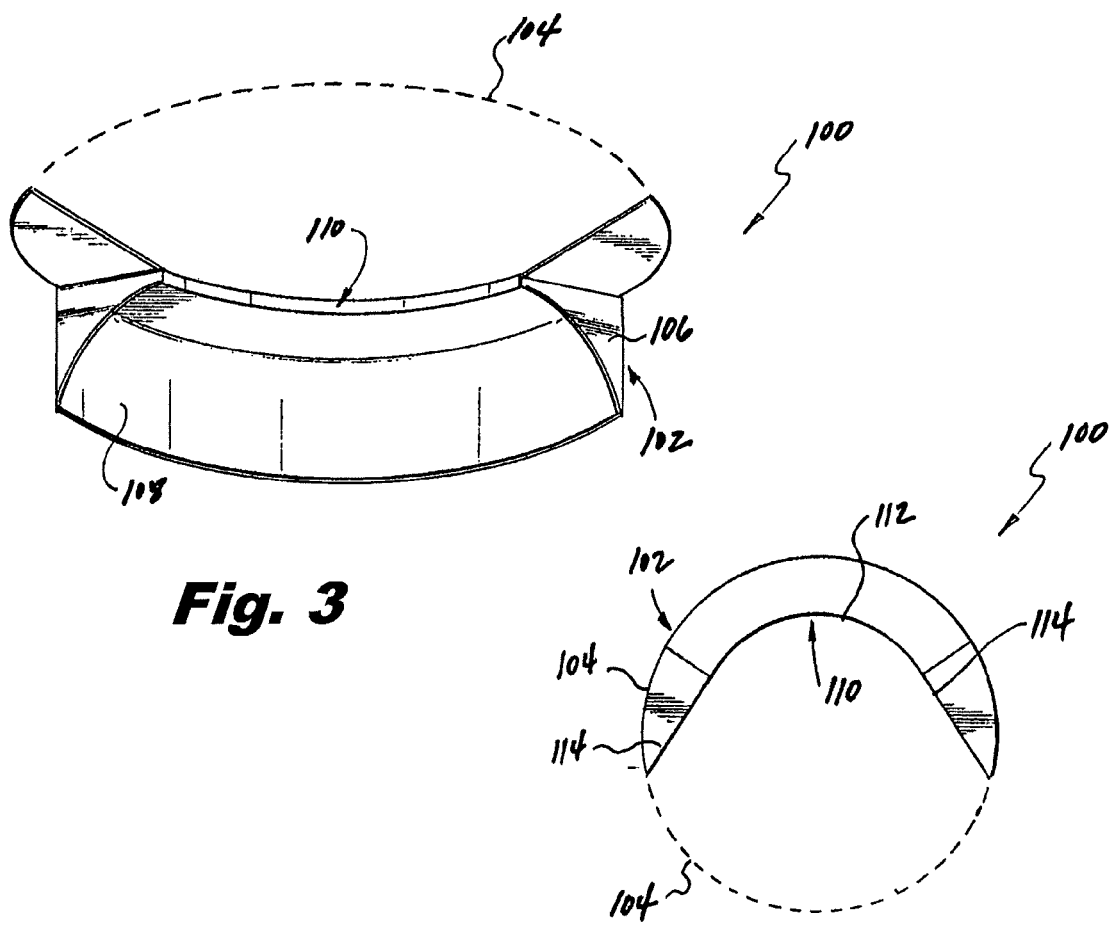
FIG. 3 is a perspective view of the deflector device of FIG. 2, showing the sloping upstream surface.

With reference now to FIG. 3, deflector device 100 includes a base 102 defining an outer circumference 104. The base is configured to be mounted inside a pipe such that base 102 extends partially around the inner circumference of the pipe with the circumferences of the pipe and of base 102 (e.g., circumference 104 and the corresponding pipe circumference) being substantially aligned concentrically (as indicated in FIG. 2). A deflector 106 extends radially inward from base 102. The upstream surface 108 of deflector 106 slopes concavely between base 102 and a radially inner periphery 110 of deflector 106. Deflector 106 is configured to direct a concentrated flow of coal particles toward the center of the pipe (e.g., stream 35 in FIG. 2).

The shape of deflector device 100 creates regions of cross mixing using its combination sloped, straight, and circular portions. In conjunction with the portion of rejects pipe 40 inside coal pipes 30 and inner cone 50, deflector device 100 provides a substantially uniform distribution of coal particles to classifier vanes 60. Rejects pipe 40 can be advantageously shielded against stream 35 of coal particles impacting thereagainst with a protective liner.

Figure 4:
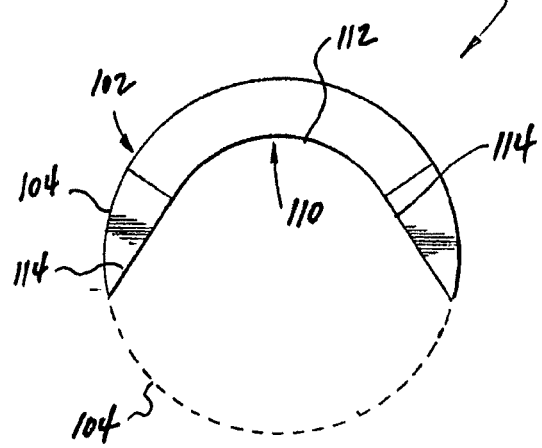
FIG. 4 is a plan view of the deflector device of FIG. 2, showing the outer circumference defined by the base, as well as the circular and straight portions of the inner periphery of the deflector.

Referring now to FIG. 4, inner periphery 110 of deflector 106 defines a substantially circular section 112 disposed circumferentially between substantially straight sections 114. A single straight section 114 is disposed tangent to each side of circular section 112, with circular section 112 circumferentially centered between straight sections 114. Straight sections 114 extend from circular section 112 outward to outer circumference 104 defined by base 102. Deflector device 100 can advantageously include a ceramic-type material, which provides for a long wear life of the device. Base 102 and other portions of deflector device 100 can be formed by casting in a monolithic casting.

Figure 5:
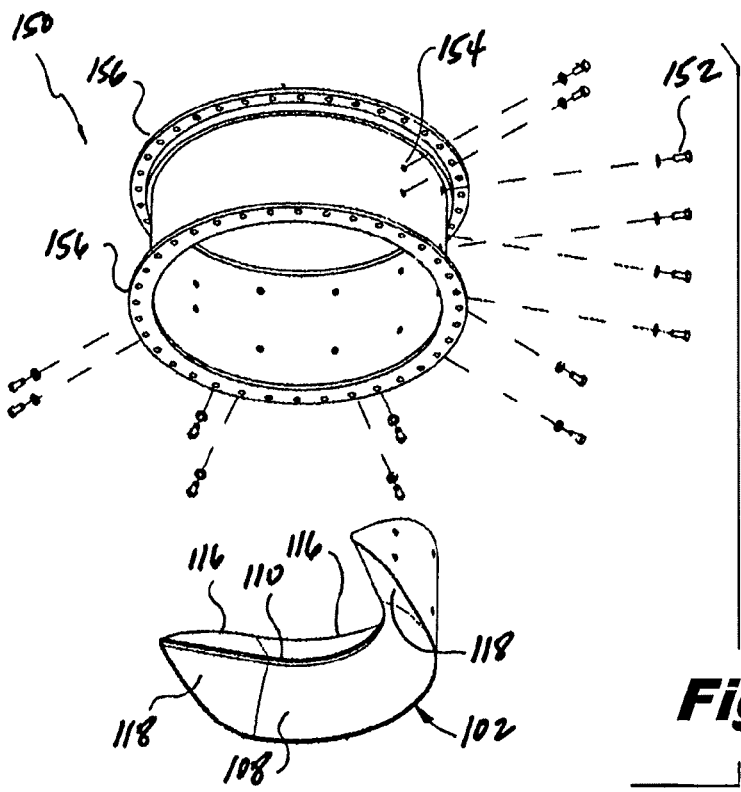
FIG. 5 is an exploded perspective view of a deflector assembly constructed in accordance with the present invention, showing the how the deflector device and spool piece can be joined with bolts.

As indicated in FIG. 5, deflector device 100 can be used in an assembly that includes a spool piece 150 having a generally cylindrical interior. Spool piece 150 is configured to be joined between end flanges of adjacent pipes in a coal piping system such that the cylindrical interior of spool piece 150 is generally aligned with the interiors of the adjacent pipes (as shown in FIG. 2). Base 102 can be mounted inside spool piece 150 such that base 102 extends partially around the inner circumference of spool piece 150 with the circumferences of spool piece 150 and base 102 being substantially aligned concentrically, as shown in FIG. 6.

As indicated in FIG. 5, deflector device 100 can be bolted to spool piece 150 using bolts 152 in bores 154 through the cylindrical portion of spool piece 150 and corresponding bores in deflector device 100. Those skilled in the art will readily appreciate that any other suitable fasteners or joining method can also be used without departing from the spirit and scope of the invention. However, bolting deflector device 100 in spool piece 150 allows for deflector device 100 to be conveniently swapped out of spool piece 150 if replacement is warranted.

Spool piece 150 includes opposed end flanges 156 configured and adapted to join spool piece 156 between end flanges of two adjacent pipes in a coal piping system (as indicated in FIG. 2). As shown in FIGS. 5-6, end flanges 156 of spool piece 150 each define a plurality of bores 158 for bolting spool piece 150 into place between two adjacent pipes to minimize the need for modifications to the surrounding system. There is often enough play between adjacent pipes to accommodate a spool piece without needing to modify other portions of the coal piping system.

Spool piece 150 can be adjusted circumferentially in increments of between about 10 and about 15 degrees, depending on how it is bolted between the adjacent pipes. This allows for a degree of fine tuning to provide good particle distribution when installed in a given system. Optimal orientation of the features of deflector device 100 within the corresponding pipe can further improve particle distribution. It is advantageous to center circular section 112 of deflector device 100 where the coal particle concentration is highest upstream of device 100.

As shown in FIG. 5, end components 118 are included on deflector device 100 adjacent the straight portions of inner periphery 110. Additionally, a downstream sloping component 116 is included on the downside portion of deflector device 100. Components 116 and 118 are optional additions that can be included for ease of manufacture and to discourage build up of flammable particles, for example, immediately downstream of deflector device 100. Substantially all of deflector 100 has a radial cross-section that is generally triangular, as shown in the cross-sectional portions of FIGS. 7-8, taken along section lines 7-7 and 8-8 of FIG. 6, respectively. As shown in FIGS. 7-8, sloping surface 108 includes a two-layered construction. The two layers can include a support base, which can be formed first, and then a ceramic-type material, which can be applied to that base layer. The base may include anchor structures to accept ceramic castable material forming the outer layer.

With reference again to FIGS. 1 and 2, the geometry of deflector device 100 allows it to streamline and center a concentration of coal particles unevenly following the boundary of coal pipes downstream of an elbow. Device 100 also serves to break the concentration of the particles up, in conjunction with the portion of rejecter pipe 40 and inner cone 50. The result is that the coal particles supplied to the classifier vanes 60 are substantially more evenly distributed when compared to the known systems. This reduces erosion and the need for replacement parts and more fully utilizes the classifier vanes. Deflector devices in accordance with the invention can be installed with or without a spool piece in new or existing systems without departing from the spirit and scope of the invention.

The methods and devices of the present invention, as described above and shown in the drawings, provide for a deflector for a coal piping system with superior properties including the ability to provide improved coal particle distribution to a coal classifier, while causing little impact on pressure drop in the system. While described above in the context of a coal piping system, those skilled in the art will readily appreciate that the methods and devices described above can be used in any other suitable application for improving particle distribution within a mixed gas/particle flow. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A deflector device for improving particle distribution within a coal piping system comprising:
   a) a base defining an outer circumference, the base being configured to be mounted inside a pipe such that the base extends partially around the inner circumference of the pipe with the circumferences of the pipe and base being substantially aligned concentrically; and
   b) a deflector extending radially inward from the base, wherein the deflector is configured to direct a concentrated flow of coal particles toward the center of the pipe, wherein the deflector has an upstream surface with a radial cross-section that slopes concavely extending in a direction from the base to a radially inner periphery of the deflector, and wherein the inner periphery of the deflector defines a substantially circular section disposed circumferentially between substantially straight sections that are substantially tangent therewith.

2. A deflector device as recited in claim 1, wherein there is a single substantially straight section on each side of the circular section of the inner periphery of the deflector.

3. A deflector device as recited in claim 2, wherein the circular section of the inner periphery of the deflector is circumferentially centered between the substantially straight sections.

4. A deflector device as recited in claim 3, wherein the substantially straight sections are each tangent with the circular section and wherein each substantially straight section extends from the circular section outward to the outer circumference defined by the base.

5. A deflector device as recited in claim 4, wherein substantially all of the deflector has a radial cross-section that is generally triangular.

6. A deflector assembly for improving particle distribution within a coal piping system comprising:
   a) a spool piece having a generally cylindrical interior, the spool piece being configured to be joined between end flanges of adjacent pipes in a coal piping system such that the cylindrical interior of the spool piece is generally aligned with the interiors of the adjacent pipes; and
   b) a deflector device including:
      i) a base defining an outer circumference, the base being mounted inside the spool piece such that the base extends partially around the inner circumference of the spool piece with the circumferences of the spool piece and base being substantially aligned concentrically; and
      ii) a deflector extending radially inward from the base, wherein the deflector is configured to direct a concentrated flow of coal particles centrally within a downstream adjacent pipe, wherein the deflector has an upstream surface with a radial cross-section that slopes concavely extending in a direction from the base to a radially inner periphery of the deflector, and wherein the inner periphery of the deflector defines a substantially circular section disposed circumferentially between substantially straight sections that are substantially tangent therewith.

7. A deflector assembly as recited in claim 6, wherein the base of the deflector device is bolted to the spool piece.

8. A deflector assembly as recited in claim 7, wherein the spool piece includes opposed end flanges configured and adapted to join the spool piece between end flanges of two adjacent pipes in a coal piping system.

9. A deflector assembly as recited in claim 8, wherein the end flanges of the spool piece each define a plurality of bores for bolting the spool piece into place between two adjacent pipes.

10. A deflector assembly as recited in claim 9, wherein the spool piece is adjustable circumferentially in increments of between about 10 and about 15 degrees.

11. A deflector assembly as recited in claim 6, wherein there is a single substantially straight section on each side of the circular section of the inner periphery of the deflector.

12. A deflector assembly as recited in claim 11, wherein the circular section of the inner periphery of the deflector is circumferentially centered between the substantially straight sections.

13. A deflector assembly as recited in claim 12, wherein the substantially straight sections are each tangent with the circular section and wherein each substantially straight section extends from the circular section outward to the outer circumference defined by the base.

14. A deflector assembly as recited in claim 13, wherein substantially all of the deflector has a radial cross-section that is generally triangular.

15. A deflector assembly as recited in claim 6, wherein the deflector has an upstream surface that slopes concavely between the base and a radially inner periphery of the deflector, wherein the inner periphery of the deflector defines a substantially circular section disposed circumferentially between substantially straight sections, wherein the spool piece includes opposed end flanges configured and adapted to join the spool piece between end flanges of two adjacent pipes in a coal piping system, and wherein the spool piece is adjustable circumferentially in increments of between about 10 and about 15 degrees.

16. A coal piping system comprising:
   a) a plurality of coal pipes connected in fluid communication with one another to convey a mixed flow of gas and coal particles therethrough;
   b) a spool piece having a generally cylindrical interior, the spool piece being joined between end flanges of two adjacent coal pipes such that the cylindrical interior of the spool piece is generally aligned with the interiors of the two adjacent pipes; and
   c) a deflector device including:
      i) a base defining an outer circumference, the base being mounted inside the spool piece such that the base extends partially around the inner circumference of the spool piece with the circumferences of the spool piece and base being substantially aligned concentrically; and
      ii) a deflector extending radially inward from the base, wherein the deflector is configured to direct a flow of coal particles centrally within a downstream adjacent coal pipe, wherein the deflector has an upstream surface with a radial cross-section that slopes concavely extending in a direction from the base to a radially inner periphery of the deflector, and wherein the inner periphery of the deflector defines a substantially circular section disposed circumferentially between substantially straight sections that are substantially tangent therewith.

* * * * *